United States Patent
Tanaka et al.

(10) Patent No.: US 8,750,511 B2
(45) Date of Patent: Jun. 10, 2014

(54) ROOT NODE AND A COMPUTER READABLE MEDIUM

(75) Inventors: Yasuyuki Tanaka, Kanagawa-ken (JP); Yoshihiro Oba, Kanagawa-ken (JP); Shinji Yamanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 100 days.

(21) Appl. No.: 13/231,479

(22) Filed: Sep. 13, 2011

(65) Prior Publication Data

US 2012/0243685 A1 Sep. 27, 2012

(30) Foreign Application Priority Data

Mar. 24, 2011 (JP) ................................ P2011-065270

(51) Int. Cl.
  *H04K 1/00* (2006.01)
  *H04L 9/00* (2006.01)
  *H04L 29/06* (2006.01)
  *H04W 12/02* (2009.01)
  *H04W 12/04* (2009.01)
  *H04L 9/08* (2006.01)

(52) U.S. Cl.
  CPC .............. *H04W 12/02* (2013.01); *H04W 12/04* (2013.01); *H04L 9/083* (2013.01); *H04L 9/0836* (2013.01)
  USPC ............................ 380/270; 380/277; 713/153

(58) Field of Classification Search
  None
  See application file for complete search history.

(56) References Cited

U.S. PATENT DOCUMENTS

| 4,972,472 | A | * | 11/1990 | Brown et al. | 380/277 |
| 5,592,671 | A | * | 1/1997 | Hirayama | 718/104 |
| 6,574,197 | B1 | * | 6/2003 | Yaguchi et al. | 370/252 |
| 7,181,620 | B1 | * | 2/2007 | Hur | 713/171 |
| 8,040,828 | B2 | * | 10/2011 | Kim et al. | 370/311 |
| 8,223,972 | B2 | * | 7/2012 | Ito et al. | 380/277 |

(Continued)

FOREIGN PATENT DOCUMENTS

JP 03004354 A * 1/1991 ............. G06F 15/16
WO WO 2011/142353 A1 11/2011

OTHER PUBLICATIONS

NNRD432173, IBM Technical Disclosure Bulletin, Apr. 2000, UK, Issue No. 432, Starting p. 776, published Apr. 1, 2000.*

(Continued)

*Primary Examiner* — Peter Poltorak
*Assistant Examiner* — Walter Malinowski
(74) *Attorney, Agent, or Firm* — Finnegan, Henderson, Farabow, Garrett & Dunner, L.L.P.

(57) ABSTRACT

A wireless mesh network includes a plurality of nodes to which a device key is assigned. The device key belongs to one of a plurality of groups. In a root node, a correspondence relationship between the nodes and the device key thereof, and a correspondence relationship between past join nodes and a device key thereof, are stored. When a new node in the wireless mesh network is detected as a past join node, the device key assigned to the past join node is assigned to the new node again. When the new node is not the past join node, a new device key is assigned to the new node. A cipher text is generated by encrypting a message using device keys assigned to the nodes and the new node. If the number of groups to which the device keys belong is fewer, a size of the cipher text is smaller.

7 Claims, 8 Drawing Sheets

(56) References Cited

U.S. PATENT DOCUMENTS

| | | | |
|---|---|---|---|
| 2002/0112077 A1* | 8/2002 | Semaan et al. | 709/245 |
| 2002/0126849 A1* | 9/2002 | Howard et al. | 380/277 |
| 2002/0152387 A1* | 10/2002 | Asano | 713/176 |
| 2004/0098502 A1* | 5/2004 | Xu et al. | 709/238 |
| 2005/0038997 A1* | 2/2005 | Kojima et al. | 713/165 |
| 2006/0059179 A1* | 3/2006 | Asano | 707/100 |
| 2006/0095771 A1* | 5/2006 | Appenzeller et al. | 713/171 |
| 2006/0188099 A1* | 8/2006 | Kondo et al. | 380/277 |
| 2007/0070983 A1* | 3/2007 | Redi et al. | 370/352 |
| 2007/0186286 A1* | 8/2007 | Shim et al. | 726/26 |
| 2007/0189249 A1* | 8/2007 | Gurevich et al. | 370/338 |
| 2007/0206537 A1* | 9/2007 | Cam-Winget et al. | 370/331 |
| 2007/0206798 A1* | 9/2007 | Isozaki et al. | 380/277 |
| 2007/0250713 A1* | 10/2007 | Rahman et al. | 713/171 |
| 2008/0013732 A1* | 1/2008 | Ohno | 380/277 |
| 2008/0055113 A1* | 3/2008 | Muro et al. | 340/870.16 |
| 2008/0165958 A1* | 7/2008 | Matsushita | 380/44 |
| 2009/0265553 A1* | 10/2009 | Balissat et al. | 713/168 |
| 2010/0174899 A1* | 7/2010 | Lin et al. | 713/153 |
| 2010/0303241 A1* | 12/2010 | Breyel | 380/277 |
| 2010/0306212 A1* | 12/2010 | Tsirogiannis et al. | 707/759 |
| 2011/0225417 A1* | 9/2011 | Maharajh et al. | 713/150 |

OTHER PUBLICATIONS

Ali, "A Key Loss Recovery Scheme for Secure Broadcasts in Wireless Sensor Networks", IEEE 19th International Symposium on Personal, Indoor, and Mobile Radio Communications, Sep. 15-18, 2008, five pages.*

Naor et al.; "Revocation and Tracing Schemes for Stateless Receivers", Advances in Cryptology—CRYPTO 2001, Springer-Verlag Inc., LNCS 2139, pp. 41-62, (2001).

* cited by examiner

| JOIN NODE DB 303 | |
|---|---|
| NODE | JOIN STATUS |
| A | PRESENT JOIN |
| B | PRESENT JOIN |
| C | PRESENT JOIN |
| D | PRESENT JOIN |
| E | PRESENT JOIN |
| F | PRESENT JOIN |
| G | PRESENT JOIN |
| H | PAST JOIN |

FIG. 4A

| DB 305 OF AUTHENTICATION FOR NETWORK ACCESS | |
|---|---|
| NODE | AUTHENTICATION INFORMATION |
| A | INFORMATION A |
| B | INFORMATION B |
| C | INFORMATION C |
| D | INFORMATION D |
| E | INFORMATION E |
| F | INFORMATION F |
| G | INFORMATION G |
| H | INFORMATION H |

FIG. 4B

| DB 306 OF ASSIGNMENT OF DEVICE KEY | | | | |
|---|---|---|---|---|
| KEY | NODE | VALID/INVALID | JOIN STATUS | LIFETIME |
| $X_1$ | A | VALID | PRESENT JOIN | OCT. 2011 |
| $X_2$ | B | VALID | PRESENT JOIN | OCT. 2012 |
| $X_3$ | C | VALID | PRESENT JOIN | OCT. 2013 |
| $X_4$ | D | VALID | PRESENT JOIN | OCT. 2015 |
| $Y_1$ | E | VALID | PRESENT JOIN | DEC. 2011 |
| $Y_2$ | F | VALID | PRESENT JOIN | NOV. 2011 |
| $Y_3$ | G | VALID | PRESENT JOIN | AUG. 2011 |
| $Y_4$ | H | VALID | PAST JOIN | JUN. 2011 |
| $Z_1$ | | | | |
| $Z_2$ | | | | |
| $Z_3$ | | | | |
| $Z_4$ | | | | |

JOIN NODE DB 303

| NODE | JOIN STATUS |
|---|---|
| A | PRESENT JOIN |
| B | PRESENT JOIN |
| C | PRESENT JOIN |
| D | PRESENT JOIN |
| E | PRESENT JOIN |
| F | PRESENT JOIN |
| G | PRESENT JOIN |
| H | PRESENT JOIN |

FIG. 6B

DB 305 OF AUTHENTICATION FOR NETWORK ACCESS

| NODE | AUTHENTICATION INFORMATION |
|---|---|
| A | INFORMATION A |
| B | INFORMATION B |
| C | INFORMATION C |
| D | INFORMATION D |
| E | INFORMATION E |
| F | INFORMATION F |
| G | INFORMATION G |
| H | INFORMATION H |

FIG. 6C

DB 306 OF ASSIGNMENT OF DEVICE KEY

| KEY | NODE | VALID/INVALID | JOIN STATUS | LIFETIME |
|---|---|---|---|---|
| $X_1$ | A | VALID | PRESENT JOIN | OCT. 2011 |
| $X_2$ | B | VALID | PRESENT JOIN | OCT. 2012 |
| $X_3$ | C | VALID | PRESENT JOIN | OCT. 2013 |
| $X_4$ | D | VALID | PRESENT JOIN | OCT. 2015 |
| $Y_1$ | E | VALID | PRESENT JOIN | DEC. 2011 |
| $Y_2$ | F | VALID | PRESENT JOIN | NOV. 2011 |
| $Y_3$ | G | VALID | PRESENT JOIN | AUG. 2011 |
| $Y_4$ | H | VALID | PRESENT JOIN | JUN. 2011 |
| $Z_1$ | | | | |
| $Z_2$ | | | | |
| $Z_3$ | | | | |
| $Z_4$ | | | | |

FIG. 7A

| JOIN NODE DB 303 | |
|---|---|
| NODE | JOIN STATUS |
| A | PRESENT JOIN |
| B | PRESENT JOIN |
| C | PRESENT JOIN |
| D | PRESENT JOIN |
| E | PRESENT JOIN |
| F | PRESENT JOIN |
| G | PRESENT JOIN |
| H | PRESENT JOIN |

FIG. 7B

| DB 305 OF AUTHENTICATION FOR NETWORK ACCESS | |
|---|---|
| NODE | AUTHENTICATION INFORMATION |
| A | INFORMATION A |
| B | INFORMATION B |
| C | INFORMATION C |
| D | INFORMATION D |
| E | INFORMATION E |
| F | INFORMATION F |
| G | INFORMATION G |
| H | INFORMATION H |

FIG. 7C

| DB 306 OF ASSIGNMENT OF DEVICE KEY | | | | |
|---|---|---|---|---|
| KEY | NODE | VALID/INVALID | JOIN STATUS | LIFETIME |
| $X_1$ | A | VALID | PRESENT JOIN | OCT. 2011 |
| $X_2$ | B | VALID | PRESENT JOIN | OCT. 2012 |
| $X_3$ | C | VALID | PRESENT JOIN | OCT. 2013 |
| $X_4$ | D | VALID | PRESENT JOIN | OCT. 2015 |
| $Y_1$ | E | VALID | PRESENT JOIN | NOV. 2011 |
| $Y_2$ | F | VALID | PRESENT JOIN | NOV. 2011 |
| $Y_3$ | G | VALID | PRESENT JOIN | AUG. 2011 |
| $Y_4$ | | INVALID | | JUN. 2011 |
| $Z_1$ | H | VALID | PRESENT JOIN | OCT. 2015 |
| $Z_2$ | | | | |
| $Z_3$ | | | | |
| $Z_4$ | | | | |

FIG. 8A

| JOIN NODE DB 303 | |
|---|---|
| NODE | JOIN STATUS |
| A | PRESENT JOIN |
| B | PRESENT JOIN |
| C | PRESENT JOIN |
| D | PRESENT JOIN |
| E | PRESENT JOIN |
| F | PRESENT JOIN |
| G | PRESENT JOIN |

FIG. 8B

| DB 305 OF AUTHENTICATION FOR NETWORK ACCESS | |
|---|---|
| NODE | AUTHENTICATION INFORMATION |
| A | INFORMATION A |
| B | INFORMATION B |
| C | INFORMATION C |
| D | INFORMATION D |
| E | INFORMATION E |
| F | INFORMATION F |
| G | INFORMATION G |

FIG. 8C

| DB 306 OF ASSIGNMENT OF DEVICE KEY | | | | |
|---|---|---|---|---|
| KEY | NODE | VALID/INVALID | JOIN STATUS | LIFETIME |
| $X_1$ | A | VALID | PRESENT JOIN | OCT. 2011 |
| $X_2$ | B | VALID | PRESENT JOIN | OCT. 2012 |
| $X_3$ | C | VALID | PRESENT JOIN | OCT. 2013 |
| $X_4$ | D | VALID | PRESENT JOIN | OCT. 2015 |
| $Y_1$ | E | VALID | PRESENT JOIN | DEC. 2011 |
| $Y_2$ | F | VALID | PRESENT JOIN | NOV. 2011 |
| $Y_3$ | G | VALID | PRESENT JOIN | AUG. 2011 |
| $Y_4$ | | | | |
| $Z_1$ | | | | |
| $Z_2$ | | | | |
| $Z_3$ | | | | |
| $Z_4$ | | | | |

ROOT NODE AND A COMPUTER READABLE MEDIUM

CROSS-REFERENCE TO RELATED APPLICATION

This application is based upon and claims the benefit of priority from Japanese Patent Application No. 2011-065270, filed on Mar. 24, 2011; the entire contents of which are incorporated herein by reference.

FIELD

Embodiments described herein relate generally to a root node and a computer readable medium for causing a computer to perform a method for controlling the root node.

BACKGROUND

Usually, a wireless mesh network forms a rooting topology of a tree shape by a plurality of nodes having one root node and a parent-child relationship between two nodes hierarchically adjacent. In the wireless mesh network, technique to share one group key among each node is known.

For example, the group key is used for authentication to confirm communicability of each node connected to the wireless mesh network. When a node newly joins in the wireless mesh network, the node (Hereinafter, it is called new node) performs an authentication for network access with the root network. If the authentication succeeds, the root node and the new node respectively generate a common cipher key, and share it. Then, the root node sends a group key encrypted by the cipher key to the new node. In this way, the new node can acquire the group key from the root node.

The group key has a lifetime (effective period). In this case, by updating the lifetime before expiration thereof, a new group key is generated. The new group key needs to be shared among all nodes connected to the wireless mesh network.

When the root node notifies the node of the new group key (connected to the wireless mesh network), in order not to leak the new group key outside the wireless mesh network, the new group key needs to be encrypted.

As a method for encrypting data, a method using MKB (Media Key Block) is used. In this method, a device key is differently assigned to each device of an object to be sent data. Next, by encrypting the data using all device keys assigned, a MKB is generated. When each device receives the MKB, the device decrypts the MKB using its own device key, and acquires the data. In this case, a size of the MKB is determined by combination of the device keys.

Usually, the MKB is a technique used for a HD DVD, and so on. By writing the MKB into the HD DVD, a HD DVD device can decrypt the MKB using the device key, and acquire the data.

When the MKB is used by the HD DVD, in order not to leak the data to another device, a revocation function is used. When a device key is leaked, the revocation function invalidates the device key, and prohibits usage thereof.

When the MKB is used for the wireless mesh network, for example, encryption/decryption of data is performed as follows. As to each node joined in the wireless mesh network, a root node differently assigns a device key. By using all device keys assigned to each node (joined in the wireless mesh network), the root node encrypts a new group key, and generates a MKB. Then, the root node sends the MKB to all nodes joined in the wireless mesh network. Each node decrypts the MKB using its own device key, and acquires the new group key.

In the wireless mesh network, the node repeatedly joins to and leaves from the wireless mesh network. Assume that the root node deletes the device key whenever the node leaves, and the root node assigns a new device key whenever the node joins. Briefly, as to a revocation function applied to the case that the MKB is used for the HD DVD, assume that the revocation function is also applied to the wireless mesh network. In this case, whenever the node repeats join/leaving, the number of device keys already used (assigned) increases. As mentioned-above, a size of MKB is determined by combination of device keys. Accordingly, whenever the number of devices keys already used increase, the size of MKB also increases. As a result, processing load of the node (connected to the wireless mesh network) also increases.

BRIEF DESCRIPTION OF THE DRAWINGS

FIGS. 4A, 4B and 4C are first schematic diagram of data bases in the root node of FIG. 3.
FIGS. 6A, 6B and 6C are second schematic diagram of data bases in the root node of FIG. 3.
FIGS. 7A, 7B and 7C are third schematic diagram of data bases in the root node of FIG. 3.
FIGS. 8A, 8B and 8C are fourth schematic diagram of data bases in the root node of FIG. 3.

DETAILED DESCRIPTION

According to one embodiment, a wireless mesh network includes a plurality of nodes to which a device key is respectively assigned. The device key decrypts a cipher text and belongs to one of a plurality of groups. A root node in the wireless mesh network includes a device key assignment DB, a join node control unit, a device key assignment unit, and a cipher text generation unit. The device key assignment DB is configured to store a correspondence relationship between the nodes and the device key assigned to each of the nodes, and a correspondence relationship between past join nodes joined in the past in the wireless mesh network and a device key assigned to each of the past join nodes. The join node control unit is configured to detect a new node newly joining in the wireless mesh network. The device key assignment unit is configured to, when the new node is the past join node, assign the device key assigned to the past join node to the new node again, and to, when the new node is not the past join node, assign a new device key to the new node. The cipher text generation unit is configured to, when a message is sent to the nodes and the new node, generate a cipher text by encrypting the message using device keys assigned to the nodes and the new node. If the number of groups to which the devices keys assigned to the nodes and the new node belong is fewer in the plurality of groups, a size of the cipher text is smaller.

Various embodiments will be described hereinafter with reference to the accompanying drawings.

(The First Embodiment)

Figure 1:
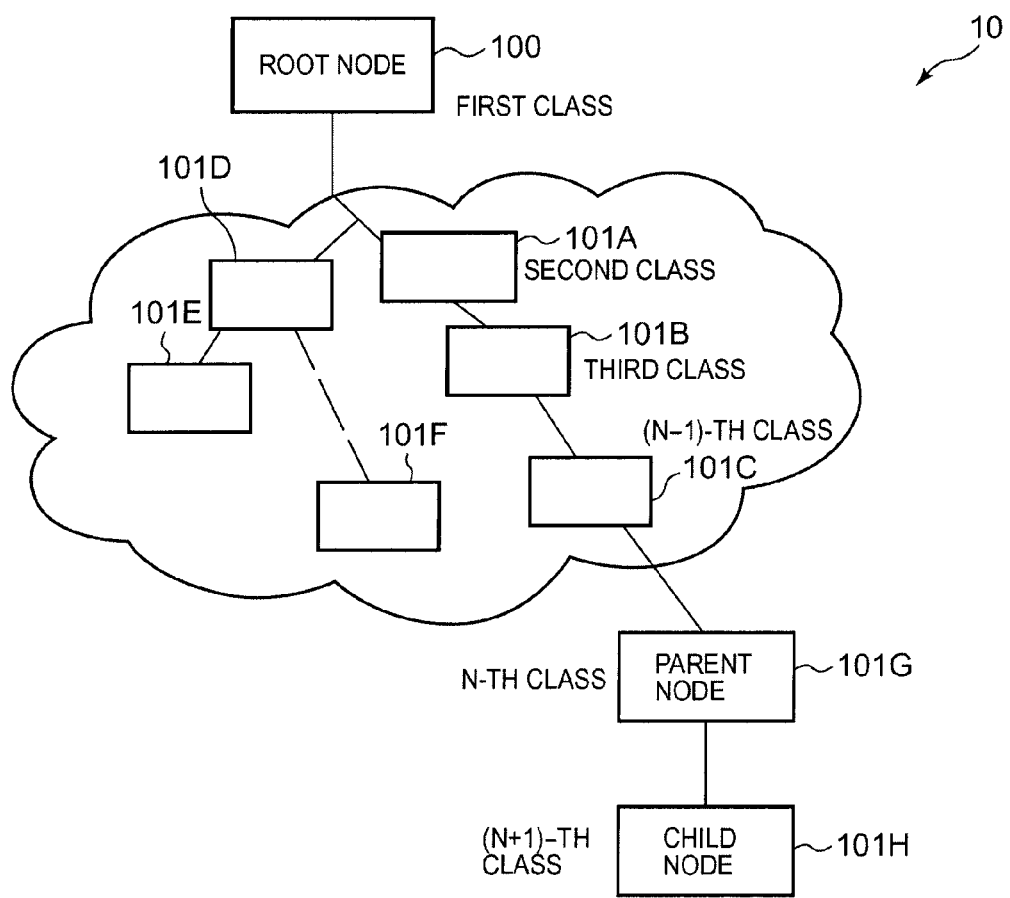
FIG. 1 is a block diagram of a system according to a first embodiment.

FIG. 1 is a block diagram of a system 10 according to the first embodiment. The system 10 is a wireless mesh network 10 forming a rooting topology. The rooting topology has a tree structure by a plurality of nodes including one root node and a parent-child relationship between two nodes hierarchically adjacent. In the system 10, if a root node 100 is the first class, a node of the lowest class is the (N+1)-th class.

In the wireless mesh network 10, one root node 100 exists. The root node 100 is a node of the highest class (the first class). The root node 100 controls each node in the wireless mesh network 10. Furthermore, the root node 100 controls group keys shared among each node in the wireless mesh network 10. Moreover, the group key is explained afterwards.

Control of the node by the root node 100 is, for example, permission/prohibition for the node to join in the wireless mesh network 10, detection for the node to leave from the wireless mesh network 10, and update of a database of nodes in the wireless mesh network 10. Furthermore, control of the group key is, for example, generation of the group key, monitor of a lifetime of the group key, and generation of a new group key by updating the group key.

A network 103 includes nodes from the second class to the (N−1)-th class in the system 10. In FIG. 1, nodes 101A and 101D are nodes of the second class, nodes 101B and 101E are nodes of the third class, and nodes 101C and 101F are nodes of the (N−1)-th class.

A parent node 101G is a node of the N-th class in the system 10. The parent node 101G connects a node 101C in the network 103. The parent node 101G receives data from the node 101C, and transfers the data to a child node 101H. In detail, as to MKB received from the node 101C, by decrypting the MKB using its own device key, the parent node 101G acquires the group key updated, and transfers the MKB to the child node 101H.

The child node 101H performs sending/receiving of data with the parent node 101G. The child node 101H is a node of the lowest class (the (N+1)-th class). In detail, as to MKB received from the parent node 101G, the child node 101H decrypts the MKB using its own device key, and acquires the group key updated.

In general, the parent node and the child node are guided from correlative positional relationship on a rooting tree. In two nodes hierarchically adjacent, a node of a higher class is the parent node, and a node of a lower class is the child node. Briefly, the parent node 101G is a parent node for the child node 101H, but a child node for a node 101C.

In the first embodiment, in order to simplify the explanation, as shown in FIG. 1, a node of the lowest class (the (N+1)-th class) in the system 10 is a child node, and a node of one class higher (the N-th class) than the lowest class is a parent class.

Figure 3:
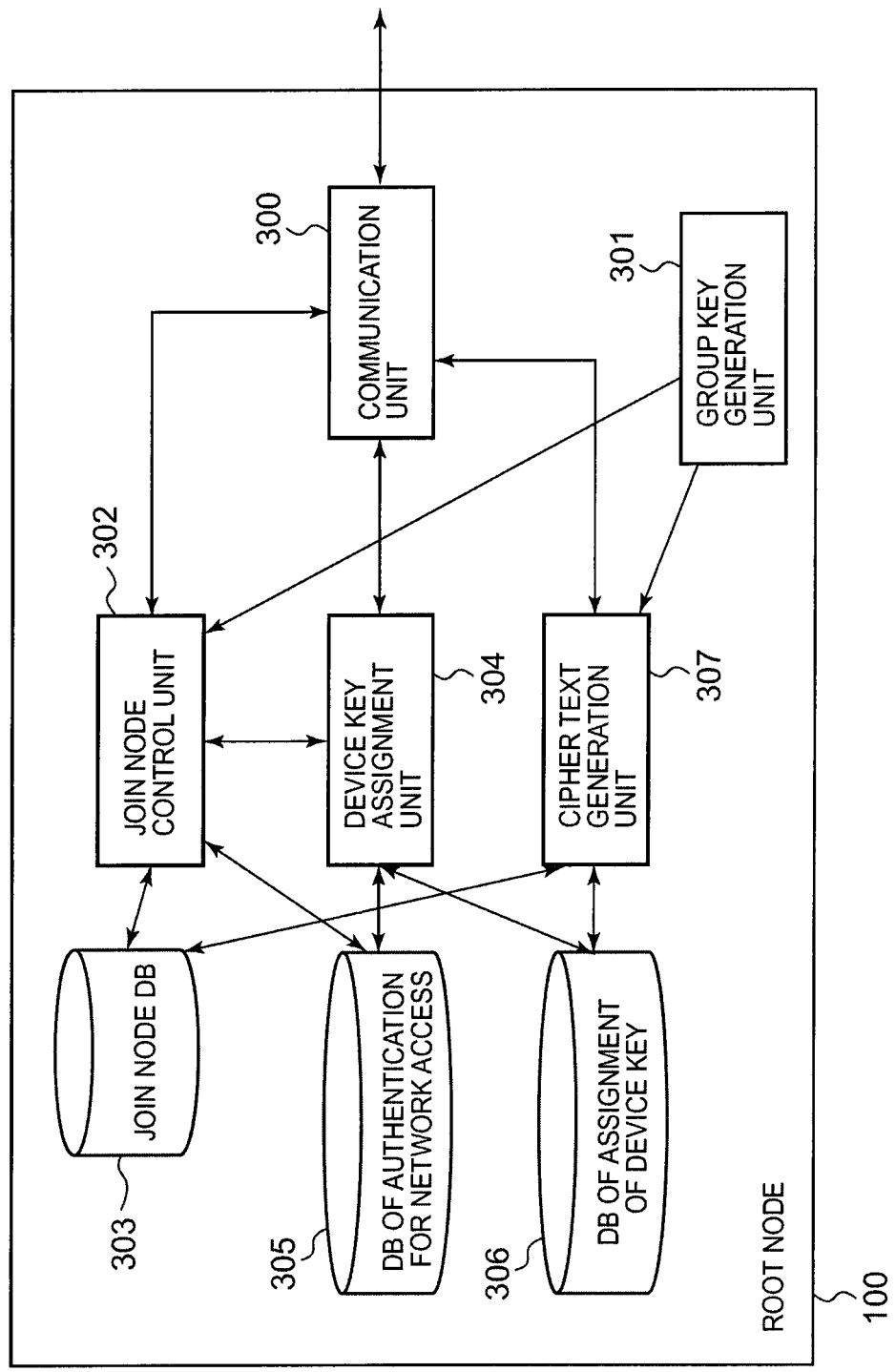
FIG. 3 is a block diagram of a root node in FIG. 1.

FIG. 3 is a block diagram of the root node 100. A communication unit 300 communicates each node in the wireless mesh network 10. A group key generation unit 301 generates a group key. A join code control unit 302 detects that a node newly joins (connects) in the wireless mesh network 10, and performs an authentication for network access with the node (It is called a new node). After the authentication for network access, the join node control unit 302 notifies a device key assignment unit 304 of the authentication result.

Furthermore, the join node control unit 302 detects that a node leaves from the wireless mesh network 10. By detecting join or leaving of the node, the join node control unit 302 updates a join node database 303. A method for updating is explained afterwards. Furthermore, by detecting join of the node, the join node control unit 302 indicates assignment of device key to the device key assignment unit 304.

The join node DB 303 controls nodes (It is called a join node) presently joining in the wireless mesh network 10, and nodes (It is called a past join node) joined in the past. For example, as shown in FIG. 4A, information to specify a node (such as an identifier to specify the node), and a join status of the node, are stored. The join node is a node of which join status is "present join", and the past join node is a node of which join status is "past join". In this case, information of the join node is combination of information to specify the node and information that the join status is "present join". Furthermore, information of the past join node is combination of information to specify the node and information that join status is "past join". Moreover, information of the join node and information of the past join node are not limited to above-mentioned information. They may be information representing which node has which join status.

FIG. 4A shows one example of information stored in the join node DB 303. By detecting join or leaving of the node, the join node control unit 302 updates information of the join node DB 303. For example, when a node 101H (presented in the past) joins again, join status is updated from "past join" to "present join". Furthermore, if a node newly joined has not joined in the past, this new node is added to the join node DB 303. Furthermore, when a node leaves from the wireless mesh network, a join status of the node is updated from "present join" to "past join". The join status stored in the join node DB 303 is referred when a cipher text generation unit 307 (explained afterwards) generates MKB by encrypting the group key updated. By referring to the join status, the cipher text generation unit 307 generates MKB decrypted by a node presently joining and not decrypted by a node not presently joining. Detail operation to generation MKB by the cipher text generation unit 307 is explained afterwards.

In response to an indication of assignment of device key from the join node control unit 302, the device key assignment unit 304 assigns device keys to nodes joining in the wireless mesh network 10. As to each node joining in the wireless mesh network 10, the device key assignment unit 304 notifies the device key assigned. In this case, the device key to be notified to a node is encrypted using a common key (route key) between the node and the root node. As to this root key, the join node control unit 302 generates using a processing result of the authentication for network access. After the device key is assigned to each node joining in the wireless mesh network 10, the device key assignment unit 304 updates a DB 306 of assignment of device key (It is called an assignment DB 306). A method for updating the assignment DB 306 is explained afterwards.

If a node newly joined in the wireless mesh network 10 is a node which has joined in the past, a device key was already assigned to the node at that time. If a lifetime of the device key does not expire, the device key assignment unit 304 assigned this device key. On the other hand, if the lifetime already expired, the device key assignment unit 304 assigns a new device key. Furthermore, if the node newly joined is a node which has not joined in the past, the device key assignment unit 304 assigns a new device key.

A DB 305 of authentication for network access (It is called an authentication DB 305) stores information to authenticate nodes joining the wireless mesh network. FIG. 4B shows one example of information stored in the authentication DB 305. The authentication DB 305 stores information necessary to authenticate each node. As one of the information necessary to authenticate, information representing whether a node has connected to the wireless mesh network in the past may be stored.

The assignment DB 306 stores a correspondence relationship between a device key and a node to which the device key is assigned. Moreover, the assignment DB 306 may store the device key itself or information to specify the device key. Furthermore, the assignment DB 306 stores information representing whether a node to which the device key was already assigned presently joins in the wireless mesh network. Furthermore, the assignment DB 306 stores information that the device key is valid or invalid. In this case, "valid" represents that the device key can be used, and "invalid" represents that the device key cannot be used (not used in the future). Furthermore, the assignment DB 306 stores information representing when a lifetime of the device key is. FIG. 4C shows one example of information stored in the assignment DB 306. For example, a device key $X_2$ is assigned to a node 101B, a lifetime of the device key $X_2$ is valid, the node 101B is joining at present, and the lifetime expires in October, 2012.

The cipher text generation unit 307 generates a MKB by encrypting a (updated) new group key using the device key (assigned to a node presently joining in the wireless mesh network), and sends the MKB. The cipher text generation unit 307 recognizes a node presently joining by referring to any information of the join node DB 305, the authentication DB 305 and the assignment DB 306. Furthermore, by referring to the assignment DB 306, the cipher text generation unit 307 searches a device key assigned to the node, and generates a MKB using the device key.

Next, a relationship between the device key and the MKB is explained. In general, a size of MKB becomes larger or smaller by combination of device keys to be used. Hereinafter, this relationship is explained by referring to FIG. 4C. In FIG. 4C, when data is encrypted using any (or all) of a group (It is called a group X) of device keys $X_1 \sim X_4$, MKB (generated as encrypted data) is represented as C. Furthermore, when data is encrypted using any (or all) of a group (It is called a group Y) of device keys $Y_1 \sim Y_4$, MKB is represented as $C_y$. When data is encrypted using any (or all) of a group (It is called a group Z) of device keys $Z_1 \sim Z_4$, MKB is represented as $C_z$. When data is encrypted using device keys of two groups (group X, group Y), MKB is represented as $C_x C_y$. In the same way, when data is encrypted using device keys of three groups (group X, group Y, group Z), MKB is represented as $C_x C_y C_z$. Briefly, if a MKB is generated using device keys belonging to few groups, a size of the MKB becomes small. On the other hand, if a MKB is generated using device keys belonging to many groups, a size of the MKB becomes large. In the first embodiment, the most suitable combination of device keys to make a size of the MKB small is, when a device key is assigned to a node, selecting device keys from groups of which the number thereof is as few as possible.

In the first embodiment, in order to make the size of the MKB as small as possible, when the device key is assigned to the node, a technique to use device keys belonging to groups of which the number thereof is as few as possible is applied. Concretely, even if a node leaves from the wireless mesh network, a device key assigned to the node is not set to a device key unable to be used. When this node joins again, the device key assigned thereto in the past is assigned again.

Next, by using above technique, the reason why device keys belonging to few groups can be assigned is explained. In FIG. 4C, the case that a node 101H which has joined in the past joins again is thought about.

If above technique is not used, a device key $Y_4$ assigned to a node 101H in the past is prohibited because the node 101H leaved. Even if the node 101H joins again, the device key $Y_4$ cannot be assigned. In this case, any of device keys $Z_1 \sim Z_4$ is newly assigned. As a result, a MKB generated by encrypting data is $C_x C_y C_z$. On the other hand, if above technique is not used, a device key $Y_4$ assigned to a node 101H in the past is not prohibited to be used, and can be assigned again. As a result, a MKB generated by encrypting data is $C_x C_y$. As mentioned-above, if the technique of the first embodiment is used, a size of the MKB can be made small. As a result, processing load of each node in the wireless mesh network is reduced.

In above explanation, the example that the number of device keys composing one group is four is described. However, the number of device keys is not limited to four. The number of device keys is a finite number. Accordingly, by using above technique, i.e., by assigning the device key assigned in the past again, device keys belonging to groups of which the number thereof is smaller can be assigned to the node joining in the wireless mesh network. Especially, in the wireless mesh network, many nodes possibly repeat join and leaving. By imaging such possibility, this technique is effective to generate a MKB having small size.

Next, a scene in which a MKB is used is explained. The MKB is used in the scene that updated group keys are distributed to each node in the wireless mesh network.

First, a group key is explained. For example, the group key is used for encryption of data in the wireless mesh network 10. The group key is information shared among all nodes in the wireless mesh network 10. Briefly, the group key is a common key for each node in the wireless mesh network 10. As to encryption/decryption using the group key, a common key cryptosystem is used.

The group key needs to be shared among all nodes joining in the wireless mesh network 10. When a node newly joins in the wireless mesh network 10, a root node notifies the node of a group key (Detail operation is explained afterwards). In this case, in order not to leak outside the wireless mesh network, the group key is encrypted and notified. A cipher key used for this encryption is a cipher key shared between the root node and the node newly joined. The cipher key is generated at a time of authentication for network access to be performed when the node newly joins.

The group key has a lifetime. Accordingly, the root node needs to update the group key (being used) before expiring the lifetime, and send a new group key (after updating) to each node in the wireless mesh network. Because it is maintained that each node in the wireless mesh network always preserves effective group key. A message including the new group key (after updating) also needs to be notified with encryption. Because this encryption prevents leakage of the group key outside the wireless mesh network.

As a method for notifying each node in the wireless mesh network of information without leakage, a MKB is generated by encrypting a new group key updated, and each node is notified.

Next, a method for the root node 100 to notify each node (in the wireless mesh network) of the group key (updated) using the MKB is explained.

The MKB is data encrypted from original data (In the first embodiment, the group key) using a plurality of device keys. When a node having a device key used for encryption acquires the MKB, the node can decrypt the MKB using the device key, and acquire the original data. On the other hand, as to another node not having the device key used for encryption, even if acquiring the MKB, this node cannot decrypt the MKB and acquire the original data. In this way, by using the MKB, all of specific objects (having the device key) can be notified of the data at one transmission. Briefly, information can be transferred effectively and safely.

Figure 2:
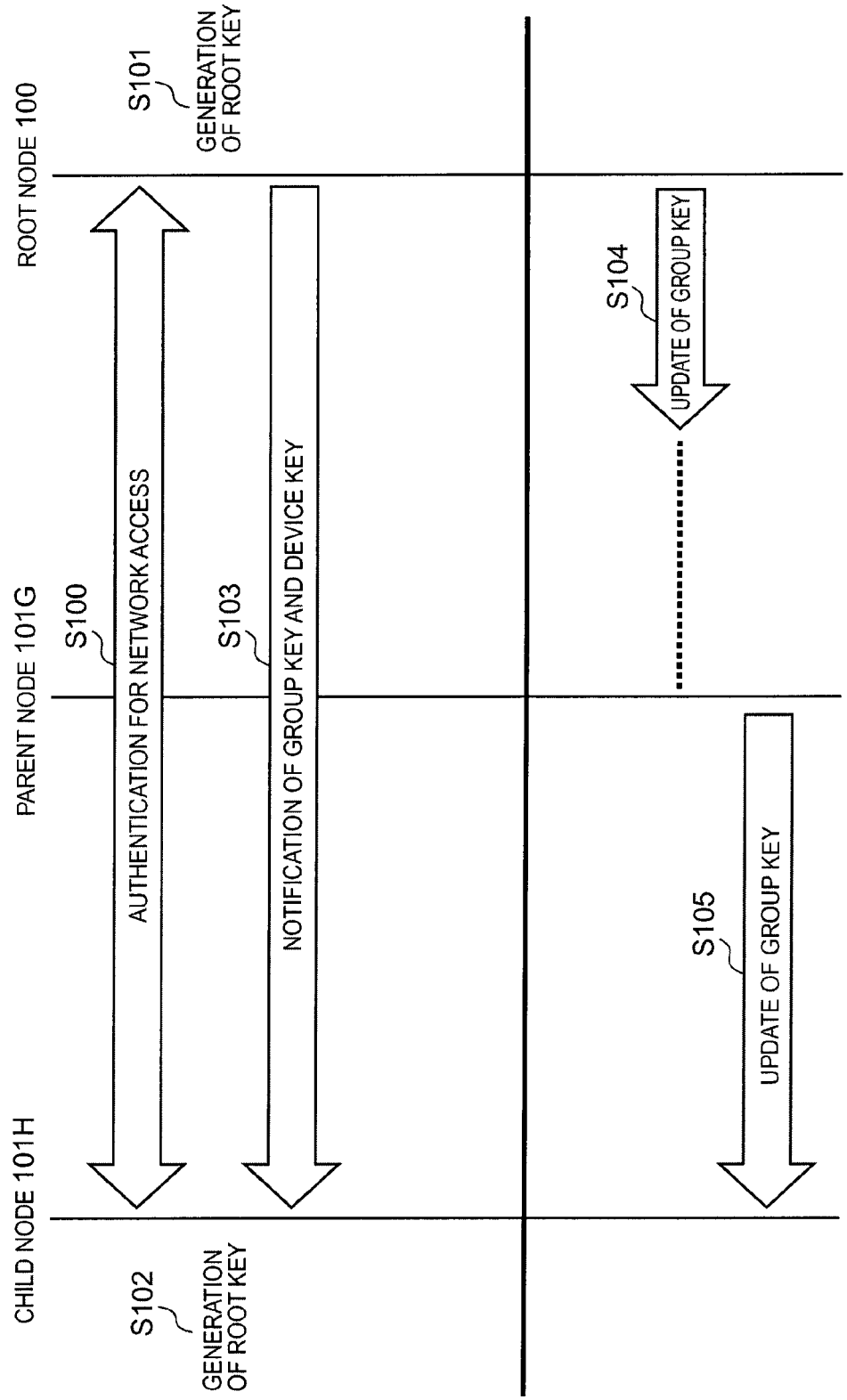
FIG. 2 is a sequence diagram of operation of the system of FIG. 1.

Next, method for transferring a group key using the MKB is explained. FIG. 2 is a sequence diagram showing operation to distribute an updated group key by encrypting as the MKB in the system of FIG. 1. Hereinafter, the case that a child node 101H newly joins in the wireless mesh network 10 is explained.

When the child node 101H newly joins in the wireless mesh network 10, the child node 101H performs authentication for network access with the root node 100 (S100). If the root node 100 succeeds in authentication of the child node 101H, the child node 101H receives a notification of authentication-success from the root node 100. After the child node 101H receives the notification, the child node 101H generates a root key using an authentication result (S102). Furthermore, the root node 100, while notifying the child node 101H, of the authentication-success, generates a root key using the authentication result in the same way as the child key 101H (S101). As a result, the root key is shared between the root key 100 and the child key 101H.

Next, as to a group key and a device key managed by the root node 100, the root node 100 encrypts them using the root key, and sends encrypted keys to the child node 101H. A method for assigning which device key to the child key 101H is explained afterwards. The child key 101H receives a notification of the group key and the device key both encrypted (S103). The child key 101H decrypts the group key and the device key using the root key, and acquires the group key and the device key.

Next, operation of the root node 100 to update the group key is explained. After updating the group key, the root node 100 generates a MKB by encrypting the group key updated, and notifies each node in the wireless mesh network of the MKB. The nodes may be notified of the MKB by broadcast or unicast. In FIG. 4C, the MKB is generated using device keys of groups X and Y. Accordingly, the MKB is $C_x C_y$.

Next, a method for the parent node 101G and the child node 101H to acquire the group key updated is explained. After acquiring the MKB, the parent node 101G acquires the (updated) group key by decrypting the MKB with its own device key $Y_3$. Furthermore, the parent node 101G transfers the MKB to the child node 101H (S105). After acquiring the MKB from the parent node 101G, the child node 101H acquires the (updated) group key by decrypting the MKB with its own device key $Y_4$.

In above-mentioned operation, processing among the root node 100, the parent node 101G and the child node 102H in FIG. 1, is explained. However, the same processing is executed for each node in a network 103. Briefly, each node in the network 103 decrypts a new group key (sent from the root node 100) using its own device key, and transfers the MKB to a node of one lower class. By repeating this processing between two nodes hierarchically adjacent, the new group key can be transferred one by one.

By above-mentioned operation, all nodes in the wireless mesh network (controlled by the root node) can share (updated) new group key effectively and safely.

Figure 5:
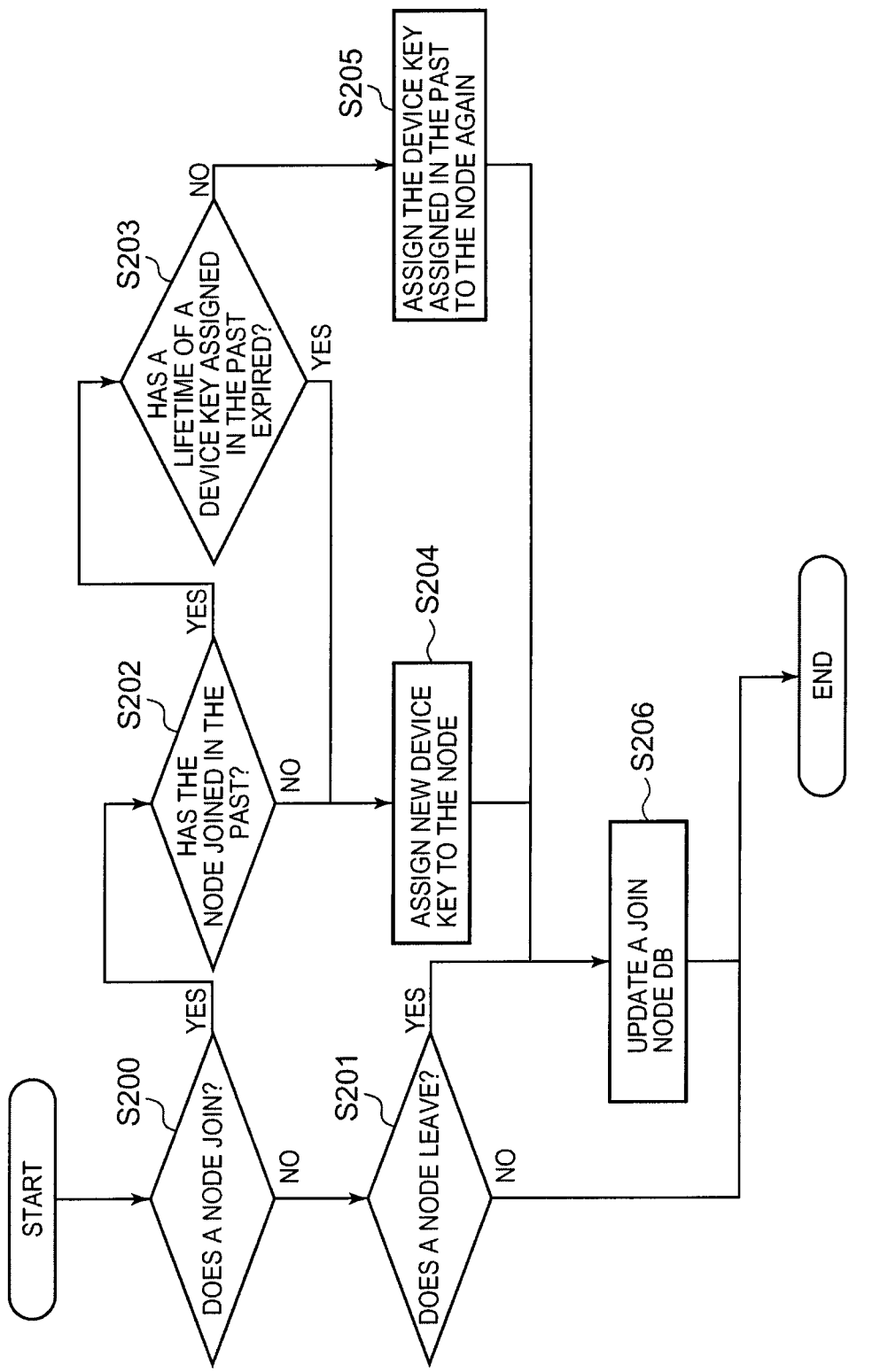
FIG. 5 is a flow chart of operation of the root node in FIG. 3.

Next, a method for assigning a device key to a child node 101H newly joining in the wireless mesh network is explained. As shown in FIG. 1, hereinafter, nodes presently joining in the wireless mesh network 10 are nodes 101A~101G, and a node newly joining is a child node 101H. FIG. 5 is a flow chart showing operation of the root node 100.

First, the join node control unit 302 decides whether a new node (node 101H) joins in the wireless mesh network 10 (S200). When the join node control unit 302 decides that the new node joins, the device key assignment unit 304 decides whether the node 101H has joined in the wireless mesh network 10 in the past (S202). For example, the device key assignment unit 304 decides whether the node 101H has joined in the past by referring to information of the join node DB 303. As shown in FIG. 4A, the node 101H has joined in the past.

Next, when the device key assignment unit 304 decides that the node 101H has joined in the past, the device key assignment unit 304 decides whether a lifetime of a device key assigned (in the past) to the node 101H has expired (S203). For example, the device key assignment unit 304 decides whether the lifetime has expired by referring to information of the assignment DB 306. When the device key assignment unit 304 decides that the lifetime has not expired yet, the device key assignment unit 304 assigned the device key (assigned in the past) to the node 101H again (S205). For example, as shown in FIG. 4C, the node 101H is a node joined in the past, and the lifetime of the node is June 2011. If the present date is February 2011, the lifetime does not expire.

On the other hand, at S203, when the device key assignment unit 304 decides that the lifetime has already expired, the device key assignment unit 304 assigns a new device key to the node 101H (S204). Furthermore, at S202, when the device key assignment unit 304 decides that the node 101H has not joined in the past, the device key assignment unit 304 assigns a new device key to the node 101H (S204). After determining the device key to be assigned, the device key assignment unit 304 notifies the node 101H of the device key via the communication unit 300. Furthermore, the device key assignment unit 304 updates information of the assignment DB 306. Furthermore, the join node control unit 302 updates information of the join node DB 303 (S206).

On the other hand, at S200, when the join node control unit 302 decides that the new node does not join, the join node control unit 302 decides whether at least one node leaved from the wireless mesh network (S201). When the join node control unit 302 decides whether the node leaved, the join node control unit 302 updates the join node DB 303, the authentication DB 305 and the assignment DB 306. Then, when the join node control unit 302 decides that any node does not leave (S201), or after processing of S206, a series of processing is completed.

Moreover, in above operation, at S202, the device key assignment unit 304 decides whether the node 101H has joined in the past by referring to information of the join node DB 303. However, information of the authentication DB 305 and the assignment DB 306 may be referred. This operation is explained using FIG. 4A~4C. The authentication DB 305 can store authentication information representing whether the node 101H has joined in the past. Furthermore, the assignment DB 306 can store "past join" as a join status of the node 101H. Accordingly, when the device key assignment unit 304 decides whether the node 101H has joined in the past, the device key assignment unit 304 decides by referring to information of the authentication DB 305 or the assignment DB 306.

Next, hereinafter, when the node (presently joining) leaves or when a node newly joins, how to update the join node DB 303, the authentication DB 305 and the assignment DB 306, which device key is assigned, and what data the MKB (generated) is, are explained. Especially, when a node newly joins, about whether the node has joined in the past, and about whether a lifetime of a device key assigned to the node (in the past) does not expire, how to update the join node DB 303, the authentication DB 305 and the assignment DB 306, which device key is assigned to the new node, and what data the MKB (generated) is, are explained.

Hereinafter, the operation is explained by referring to a system 10 of FIG. 1. In the system 10 of FIG. 1, nodes joining in the wireless mesh network are 101A, 101B, 101C, 101D, 101E, 101F, 101G and 101H.

Under this situation, information of the join node DB 303, the authentication DB 305 and the assignment DB 306, are shown in FIGS. 6A~6C. When a MKB is generated, device keys ($X_1, X_2, X_3, X_4$) of group X and device keys ($Y_1, Y_2, Y_3, Y_4$) of group Y are used. Accordingly, the MKB (generated) is represented as $C_xC_y$.

Next, a case that the child node 101H leaves from this situation is explained. When the child node 101H leaves from this situation, information of the authentication DB 305 and the assignment DB 306 are shown in FIG. 4. In comparison with FIG. 6, as a first difference of FIG. 4, a join status of the node 101H in the join node DB 303 changes from "present join" to "past join" (FIG. 4A). As a second difference of FIG. 4, a join status of the node 101H in the assignment DB 306 changes from "present join" to "past join" (FIG. 4C). When a MKB is generated, device keys ($X_1, X_2, X_3, X_4$) of group X and device keys ($Y_1, Y_2, Y_3$) of group Y are used. Accordingly, the MKB (generated) is represented as $C_xC_y$.

Next, in FIG. 1, after the child node 101H has leaved, a case that the child node 101H joins again and a lifetime of a device key assigned to the child node 101H (in the past) does not expire is explained.

When the child node 101H joins again, information of the authentication DB 305 and the assignment DB 306 changes from situation of FIG. 4 to situation of FIG. 6. In comparison with FIG. 4, as a first difference of FIG. 6, a join status of the node 101H in the join node DB 303 changes from "past join" (FIG. 4A) to "present join". As a second difference of FIG. 6, a join status of the node 101H in the assignment DB 306 changes from "past join" (FIG. 4C) to "present join". When a MKB is generated, device keys ($X_1, X_2, X_3, X_4$) of group X and device keys ($Y_1, Y_2, Y_3, Y_4$) of group Y are used. Accordingly, the MKB (generated) is represented as $C_xC_y$.

Next, in FIG. 1, after the child node 101H has leaved, a case that the child node 101H joins again and a lifetime of a device key assigned to the child node 101H (in the past) has expired is explained.

When the child node 101H joins again, information of the authentication DB 305 and the assignment DB 306 changes from situation of FIG. 4 to situation of FIG. 7. In comparison with FIG. 4, as a first difference of FIG. 7, a join status of the node 101H in the join node DB 303 changes from "past join" to "present join". As a second difference of FIG. 7, valid/invalid status of a device key $Y_4$ in the assignment DB 306 changes from "valid" to "invalid". As a third difference of FIG. 7, a device key $Z_1$ is newly assigned to a node H. When a MKB is generated, device keys ($X_1, X_2, X_3, X_4$) of group X, device keys ($Y_1, Y_2, Y_3$) of group Y and device keys ($Z_1$) of group Z, are used. Accordingly, the MKB (generated) is represented as $C_xC_yC_z$.

Next, in FIG. 1, a case that the child node 101H has not joined in the past and joins for the first time is explained.

Before the child node 101H joins, information of each DB is shown in FIG. 8. After the child node 101H joined, information of each DB is shown in FIG. 6. In comparison with FIG. 8, as a first difference of FIG. 6, the node 101H is newly added to the join node DB 303 (FIG. 6A). As a second difference of FIG. 6, authentication information H is newly added to the node 101H in the authentication DB 305 (FIG. 6B). As a third difference of FIG. 6, a device key Y4 is newly added to the node 101H in the assignment DB 306 (FIG. 6C). When a MKB is generated, device keys ($X_1, X_2, X_3, X_4$) of group X and device keys ($Y_1, Y_2, Y_3, Y_4$) of group Y are used. Accordingly, the MKB (generated) is represented as $C_xC_y$.

As mentioned-above, in the first embodiment, even if the node repeatedly joins and leaves, the device key already assigned to the node in the past is assigned again. As a result, by using device keys belonging to groups of which the number thereof is smaller, the MKB can be generated.

According to the first embodiment, after updating a group key in the wireless mesh network, when the group key is transferred, a size of the MKB generated thereat can be smaller. As a result, processing load of each node in the wireless mesh network can be reduced.

As mentioned-above, in the first embodiment, MKB generated using one group is data (For example, $C_x$) having a fixed length, irrespective of the number of device keys belonging to the one group. However, a length of the data often changes according to the number of device keys. Furthermore, as mentioned-above, when MKB is generated using device keys belonging two groups or three groups, irrespective of the number of device keys, the MKB is represented as $C_xC_y$ and $C_xC_yC_z$ respectively. However, a length of the data often changes according to a length of the device key. In this case, when the MKB is generated using the same number of device keys, if the device keys are selected from the smaller number of groups, a length of MKB (generated) more shortens. Briefly, when MKB is generated using a fixed number of device keys, by selecting device keys belonging to smaller number of groups, the MKB having a shorter size can be generated.

Furthermore, in the first embodiment, as to MKB generated using device keys, assume that the device keys are selected from one group, for example, the device keys are selected from group X, or the device keys are selected from group Y. In this case, a length of data $C_x$ and a length of data $C_y$ may be different or equal. If they are different, when device keys are selected, device keys had better be selected from groups to generate data having shorter length.

Furthermore, in the first embodiment, the case that the number of groups including device keys is three is explained. However, the number of groups is not limited to three.

Furthermore, in the first embodiment, an example that the number of device keys belonging to one group is four is explained. However, the number of device keys belonging to one group is not limited to four.

For example, the number of device keys belonging to one group may be one. In this case, assignment by selecting the most suitable device key so as to make data of a MKB small is preferential selection of a device key able to generate the MKB having smaller size.

Furthermore, in the first embodiment, an example that a MKB is generated by encrypting an updated group key is explained. However, the MKB may be generated by encrypting information except for the updated group key, and encrypted information may be transferred to each node in the wireless mesh network. For example, the encrypted information is information not to be leaked outside the wireless mesh network. Furthermore, if information is to be transferred to a specific device in the wireless mesh network, the MKB can be used.

Furthermore, in the first embodiment, an example that a MKB is generated by encrypting an updated group key is explained. However, a method for encrypting group key may one except for the MKB. Briefly, the method for encrypting needs to satisfy following condition. Concretely, first, a key peculiar to each node is assigned to the node in the wireless mesh network. Then, the root node encrypts the updated group key using the key assigned to each key, and generates a cipher text. Each node in the wireless mesh network decrypts the cipher text using the key peculiar to the node, and acquires the updated group key. Furthermore, the node transfers the cipher text to a node of one lower class. The method for encrypting which satisfies above-mentioned condition can be used. For example, as to a broadcast encryption or a radio encryption, this method is used.

Furthermore, in the first embodiment, when the updated group key is encrypted, a MKB is generated using device keys assigned to all nodes being joining, and the MKB is sent to all nodes being joining. However, the MKB may be generated using a device key assigned to a part of nodes being joining, and the MKB may be sent to the part of nodes. For example, in FIG. 1, a MKB may be generated using device keys assigned to nodes 101A, 101B, 101C, 101D and 101H, and the updated group key as the MKB may be sent to the nodes 101A, 101B, 101C, 101D and 101H. Then, as to other nodes, a MKB may be generated for each node as an object to be sent, and the updated group key as the MKB may be sent to each node. In this way, a size of the MKB can be smaller, and processing load of each node in the wireless mesh network can be reduced.

Furthermore, in the first embodiment, as a lifetime of the device key in the assignment DB 306, "time" is stored. However, the lifetime is not limited to "time". For example, as the lifetime, a predetermined period able to pass from timing when a device key is assigned to the node for the first time may be stored. Furthermore, as the lifetime, the number of times to assign the device key to the node may be stored.

Moreover, the root node 100 can be realized by using a general purpose computer as a basic hardware. Briefly, the communication unit 300, the group key generation unit 301, the join node control unit 302, the join node DB 303, the device key assignment unit 304, the authentication DB 305, the assignment DB 306, and the cipher text generation unit 307, can be realized by executing a program with a processor loaded onto above-mentioned computer. In this case, the root node 100 may be realized by installing above-mentioned program into the computer. Alternatively, the root node 100 may be realized by suitably installing this program into the computer, i.e., by storing this program into a storage medium such as a CD-ROM, or by distributing this program via a network. Furthermore, the join node DB 303, the authentication DB 305, and the assignment DB 306, can be realized by suitably utilizing a memory or a hard disk (stored into or exteriorly attached to the above-mentioned computer), or a storage medium such as a CD-R, CD-RW, DVD-RAM or DVD-R.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A root node in a wireless mesh network including a plurality of nodes to which a device key is respectively assigned, each of the device keys decrypting a cipher text and belonging to one of a plurality of groups, wherein a number of the device keys belonging to each group is a finite number, the root node being realized in a computer by executing a program with a processor, the root node comprising:

a device key assignment database configured to store a correspondence relationship between the each of the plurality of nodes and its assigned device key, and correspondence relationships between past join nodes joined in the past in the wireless mesh network and a device key assigned to past join nodes;

a join node control unit configured to detect a new node newly joining in the wireless mesh network;

a device key assignment unit configured to:
when the new node is one of the past join node, assign a past device key that was assigned to the past join node to the new node again, based on the correspondence relationships,
when the new node is not one of the past join node, assign a new device key to the new node,
encrypt the device key assigned to the new node, and notify the new node of the encrypted device key; and a cipher text generation unit configured to, when a message is sent to the nodes and the new node, generate a cipher text by encrypting the message using the device keys assigned to the nodes and the new node,
wherein the cipher text has a fixed length if the message is encrypted using device keys belonging to the same group, and
a size of the cipher text is reduced if a number of groups to which the device keys assigned to the nodes and the new node belong is reduced.

2. The root node according to claim 1,
wherein the plurality of the nodes has a parent-child relationship between two of the nodes hierarchically adjacent, and
wherein the cipher text can be decrypted by each of the nodes and the new node, and can be transferred from each of the nodes to a child node of each of the nodes.

3. The root node according to claim 2, wherein the cipher text is MKB (Media Key Block).

4. The root node according to claim 3,
wherein, when a group key as a common key among the nodes is updated, the message is generated as an updated group key.

5. The root node according to claim 4, wherein:
the join node control unit, when the new node is detected, performs an authentication for network access with the new node, and generates an authentication result of the authentication for network access, and
the device key assignment unit generates a root key as a common key between the root node and the new node using the authentication result, encrypts the device key assigned to the new node using the root key, and notifies the new node of the encrypted device key.

6. The root node according to claim 5,
wherein the device key assignment database further stores a lifetime of each device key, and
wherein the device key assignment unit, if the new node is the past join node and if the lifetime of the device key assigned to the past join node does not expire, assigns the device key assigned to the past join node to the new node, and, if the lifetime of the device key assigned to the past join node has expired, assigns the new device key to the new node.

7. A non-transitory computer readable medium storing instructions that, when executed by a processor, cause a computer to perform a method for controlling a root node in a wireless mesh network including a plurality of nodes to which a device keys are respectively assigned, each of the device keys decrypting a cipher text and belonging to one of a plurality of groups, wherein a number of the device keys belonging to each group is a finite number, the method comprising:

storing a correspondence relationship between each of the plurality of nodes and its assigned device key, and correspondence relationship between past join nodes joined in the past in the wireless mesh network and device keys assigned to the past join nodes;

detecting a new node newly joining in the wireless mesh network;

when the new node is the past join node, assigning a past device key that was assigned to the past join node to the new node again; based on the correspondence relationships;

when the new node is not the past join node, assigning a new device key to the new node;

encrypting the device key assigned to the new node;

notifying the new node of the encrypted device key; and when a message is sent to the nodes and the new node, generating a cipher text by encrypting the message using the device keys assigned to the nodes and the new node, wherein the cipher text has a fixed length if the message is encrypted using device keys belonging to the same group, and a size of the cipher text is reduced if a number of groups to which the device keys assigned to the nodes and the new node belong is reduced.

* * * * *